United States Patent [19]

Dion

[11] 4,059,233

[45] Nov. 22, 1977

[54] FORAGE HARVESTER

[75] Inventor: Narcisse Dion, Ste-Therese Ouest, Canada

[73] Assignee: B. & R. Choiniere Ltee, Canada

[21] Appl. No.: 716,562

[22] Filed: Aug. 23, 1976

Related U.S. Application Data

[63] Continuation-in-part of Ser. No. 559,305, March 17, 1975, abandoned.

[51] Int. Cl.$^2$ .................. B02C 9/02; B02C 18/06
[52] U.S. Cl. ............................ 241/47; 241/223; 241/239
[58] Field of Search ............ 241/47, 221, 222, 223, 241/239, 240

[56] References Cited

U.S. PATENT DOCUMENTS

| 3,348,594 | 10/1967 | Hoch | 241/222 UX |
| 3,552,463 | 1/1971 | Witt | 241/222 |
| 3,817,464 | 6/1974 | Sousek | 241/222 |
| 3,916,605 | 11/1975 | Richards et al. | 241/222 X |

FOREIGN PATENT DOCUMENTS

| 93,543 | 5/1962 | Denmark | 241/222 |

Primary Examiner—Roy Lake
Assistant Examiner—Howard N. Goldberg
Attorney, Agent, or Firm—Raymond A. Robic; Arthur Schwartz; Eugene Mar

[57] ABSTRACT

A forage chopping and propelling device including a casing having an inclined bottom and disposed therein a chopper rotor and a booster impeller that operate as an integrated assembly to receive forage from an inlet, chop the forage and eject the chopped forage out a discharge chute. The forage travels along a rectilinear path from the inlet to the discharge chute and undergoes recutting by at least one recutting bar disposed between the chopper rotor and the booster impeller.

11 Claims, 5 Drawing Figures

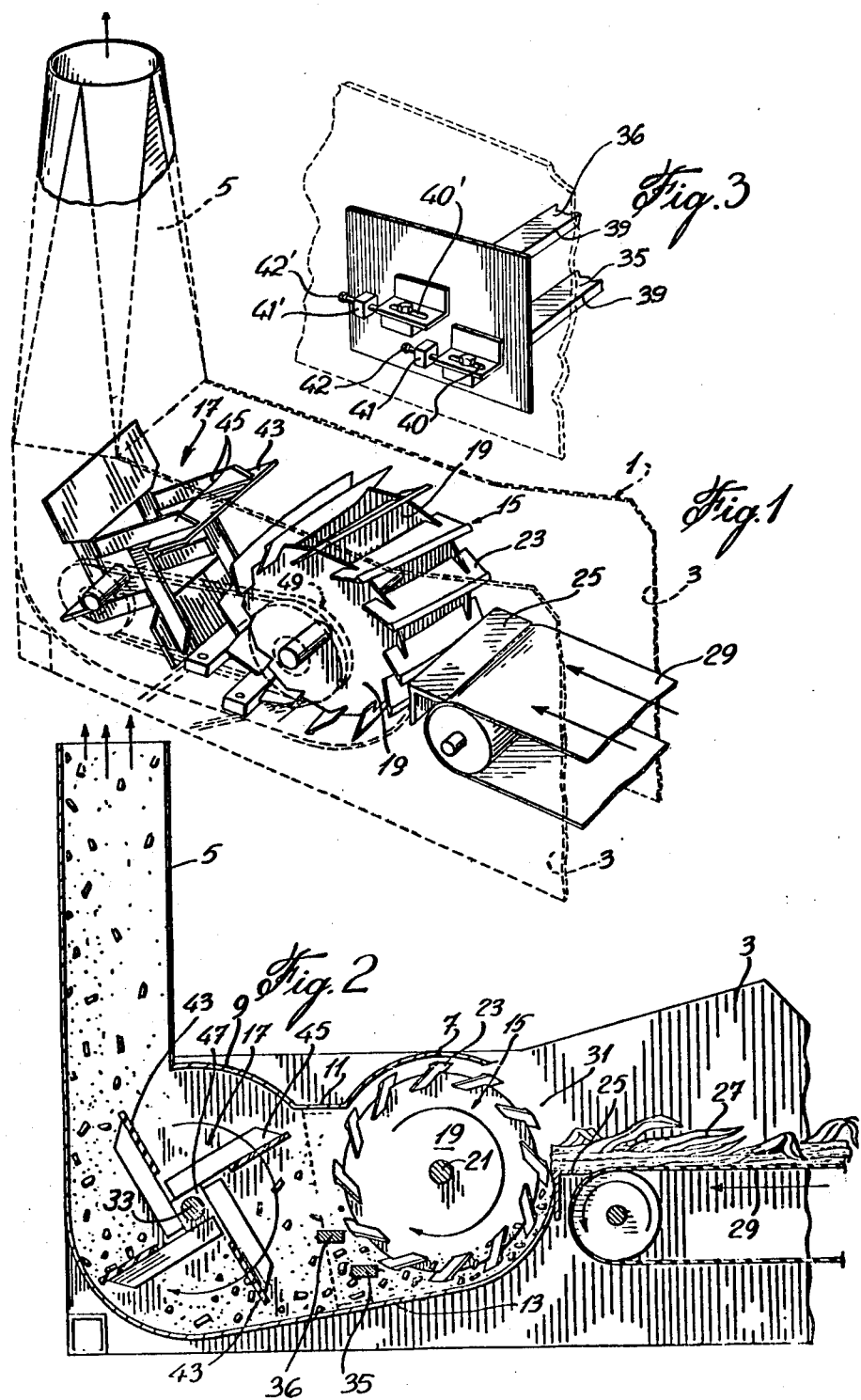

FORAGE HARVESTER

CROSS REFERENCE TO RELATED APPLICATION

The present application is a continuation-in-part of my co-pending U.S. application Ser. No. 559,305 filed Mar. 17, 1975, now abondoned.

BACKGROUND OF THE INVENTION

1. Field of the Invention

The present invention relates to a forage harvester and more particularly to a chopping and propelling apparatus adapted to be mounted in such harvester. The purpose of a machine of the above type is to chop forage greens, more particularly corn. Now, the only part of corn which is truly of nutritive value for animals are the grains and these have to be cut open in order truly to be of worth as otherwise they would not be absorbed by the stomach of the animal.

2. Description of the Prior Art

Forage harvesters of the prior art are characteristically inefficient in both construction and manner of operation. Thus it is usual to use only one rotor intended for carrying the dual operation of chopping and propelling. This approach is particularly inefficient in view of the fact that the chopper blades are not designed to provide a propelling function and thus little centrifugal action is achieved thereby. On the other hand, if the design is altered so as to improve the propelling effect, this is inevitably done at the lose of efficiency in the chopping operation which, as mentioned previously, is important in this type of apparatus to provide adequate breaking up of the corn grains. A single rotor forage harvester of this type is disclosed in the Danish Pat. No. 93,543 of May 28, 1962.

Attempts have been made to avoid the above-mentioned difficulty by providing, along with the chopping rotor, a cooperating auxiliary of boosting impeller intended specifically to propel the chopped forage. U.S. Pat. No. 3,805,660 of Apr. 23, 1974 is typical of this type of equipment intended to promote a greater degree of efficiency. However, in the latter patent, the boosting impeller is arranged for rotation about an axis which is perpendicular to the axis of rotation of the chopper rotor. The forage which is cut by the chopper rotor must of necessity undergo a 90° change in flow direction when it is subjected to the propelling action of the boosting impeller. A harvester of this type is therefore inefficient due to the fact that the flow of forage which is chopped and propelled does not travel in a smoothly continuous flow.

SUMMARY OF THE INVENTION

Contrasting with the forage harvesters of the prior art, my harvester includes a chopper rotor and a boosting impeller of which the axes of rotation are spaced from and are parallel to each other so that the cut forage may flow efficiently and smoothly in a continuous path. It is not necessary, as in the harvester of U.S. Pat. No. 3,805,660, for the chopped forage to undergo a 90° change in direction. Also, my harvester includes means disposed between the chopper rotor and the boosting impeller for further cutting the forage chopped by the chopper rotor. This means preferably takes the form of at least one bar having a cutting edge that can be adjustably positioned in relation to the periphery of the cutting rotor.

More specifically, the invention is directed toward a forage chopping and propelling device which comprises, in combination: a casing having an inlet at one end and a discharge chute at the other end; means for feeding the forage into the inlet of the casing; a chopper rotor having a first axis of rotation disposed within the casing for chopping the forage fed into the said inlet; means disposed between the feeding means and the chopper rotor for cooperating with the chopper rotor in chopping the forage; a booster impeller disposed within the casing for propelling the chopped forage through the discharge chute, this impeller having a second axis of rotation spaced from and parallel to the first axis of rotation, and means disposed between the first and the second axes of rotation for further cutting the forage chopped by the chopper rotor.

BRIEF DESCRIPTION OF THE DRAWINGS

A forage chopping and propelling device made according to the present invention will now be described with reference to the appended drawings wherein:

FIG. 1 is a perspective view of a forage harvester, the casing thereof being shown in phantom;

FIG. 2 is a longitudinal and vertical cross-section of the harvester of FIG. 1;

FIG. 3 is a perspective view of the means used for adjusting the cutting bars at the chopper rotor outlet;

DESCRIPTION OF THE PREFERRED EMBODIMENTS

Figure 5:
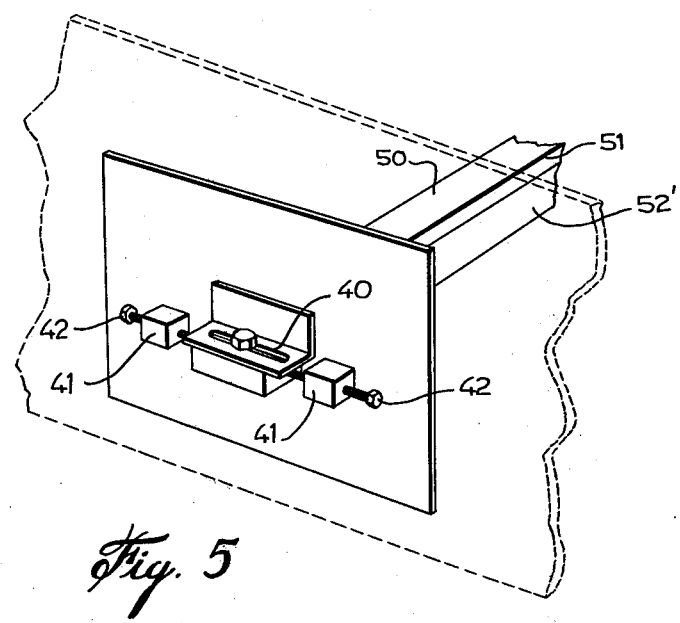
FIG. 5 is a perspective view of the means used for adjusting the bar of the bar means of the embodiment of FIG. 4.

Referring now to the drawings, the apparatus comprises a casing 1 having a pair of spaced upright sidewalls 3 terminating, at one end, into a discharge chute 5 of which the upper end may be connected to extensions (not shown) intended to carry the chopped forage at selected points. The casing comprises, between the sidewalls 3, portions of cylinders 7 and 9 laterally interconnected, as shown, by a common top wall 11 and bottom wall 13 whereby to define, along with the sidewalls 3, a housing for a chopper rotor 15 and a housing for a booster impeller 17.

The chopper rotor 15 is made up of a pair of side cheeks 19 fixedly mounted on a shaft 21 journalled in the sidewalls 3 in a conventional manner. Cheeks 19 are interconnected by a series of peripheral blades 23 slightly rearwardly inclined in the direction of rotation (see FIG. 2) with respect to the axis of the shaft 21 whereby to attack a feeding apron 25 gradually from one end to the other, as clearly shown in FIG. 1. The blades 23 have a sharp forward cutting edge for the obvious purpose of chopping the forage greens 27 fed onto the apron 25 by conventional conveyor 29. The housing 7 is suitably cut off at the feeding end of the chopper rotor 15 to define an inlet 31 for the forage greens 27.

The housing 7, rotor 15 and conveyor 29 are of conventional construction and need not be described any further except to point out that in order to provide acceptable chopping efficiency, it is necessary that the peripheral blades 23 project from the periphery of the side cheeks 19 only a short distance so that such blades 23 have very little blower effect, as aforesaid.

The rotary booster impeller is rotatably mounted on a shaft 33 journalled in the two sidewalls 3 and is located between the chopper rotor 15 and the discharge chute 5. The impeller housing 9 has an inlet which is in communication with the outlet of the rotor housing 7 whereby to receive the forage chopped by the rotor 15. The housing 9 also has an outlet in direct communication with the discharge chute 5 whereby a chopped forage is forcibly propelled into it, tangentially.

Further cutting of the chopped forage is obtained as it is forced onto two bars 35 and 36 extending between the sidewalls 3 and fully across the chopper rotor outlet. As best illustrated in FIG. 3, the two bars 35 and 36 have rectangular cross-sections and sharp cutting edges 39. With such bars, finer forage is obtained which can be propelled at greater distances by the impeller booster 17.

As shown, the two bars 35 and 36 are spaced apart one from the other, and follow the adjacent periphery of the rotor 15. They are adjusted and secured in position by conventional horizontally adjustable fastening means, comprising adjusting slots 40 and 40', threaded abutments 41 and 41', and set screws 42 and 42'.

Referring to FIG. 2, it will be seen that the impeller 17 and rotor 15 are mounted for rotation about substantially horizontal and parallel axes lying in a plane downwardly inclined toward the discharge chute 5, the latter being substantially vertical. The angle of inclination of this plane with the horizontal is between 5° and 35°, preferably 17°. The straight bottom wall 13, which is common to both the rotor housing 7 and the booster impeller housing 9, is substantially parallel to the common plane of the axes of the shafts 21 and 33. This inclination feature of the aforesaid shafts and bottom wall 13 allows an easier flow of the chopped forage from the rotor 15 to the chute 5.

As a separate implement is provided to afford more positive propulsion of the chopped forage from the harvester, a more positive design can be given to the booster impeller 17 to ensure a greater blowing action. The preferred embodiment illustrated shows the impeller to comprise a series of straight flat paddles 43 radially projecting and transversely and axially extending from the shaft 33. For that purpose, each paddle 43 is secured at the outer ends of a pair of arms 45 of which the inner end is secured on one face of a pair of square plates 47 fast with the shaft 33.

As will readily be appreciated from a perusal of FIG. 2, this particular design will give a very strong blowing and propelling impulse to the bits of chopped forage.

As shown in phantom in FIG. 1, both the rotor 15 and the impeller 17 may be brought into rotation simultaneously by the same belt drive 49 with the sheave corresponding to the shaft 33 being smaller in diameter than that corresponding to the shaft 21 to drive the impeller 17 faster.

Figure 4:
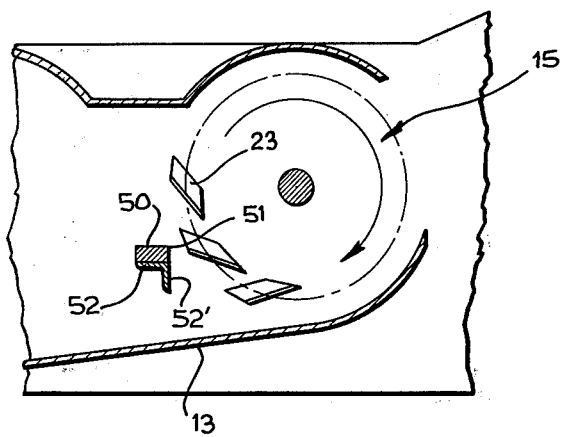
FIG. 4 is a partial longitudinal and vertical cross-section of a device according to the invention intended to illustrate a variant wherein a single chopping bar means is used at the chopping rotor outlet.

Referring now to the variant of FIGS. 4 and 5, I have found it possible appreciably to reduce the power requirement for operating the harvester by using only one cutting bar means in the form of a single bar 50, disposed generally at mid distance between the positions occupied by the bars 35, 36 of the embodiment of FIG. 2, and having a cutting edge 51 like cutting edges 39 of bars 35, 36. Also, this single cutting means includes an angle bar of which one flange 52 is horizontal and secured beneath the bar 50 and the other flange 52' is vertical and depends downwardly from the cutting edge 51 of the bar 50 to terminate short of the casing bottom wall 13.

Possibly because of the funnelling effect of the inlet created by this depending flange 52' and the adjacent periphery of the chopper rotor 15, it is found that such single bar means is as efficient as the double bar arrangement of FIG. 2. However, the power consumption is appreciably reduced for the same forage output.

Merely by way of example, it may be added that particularly good results have been obtained, in a forage harvester using a chopper rotor having 20 inches in diameter, by locating the bar means 50, 52' so that the lower edge of the flange 52' stands at a distance of 3 7/16 inches from the bottom wall 13. Also, in this embodiment as well as in that of FIG. 2, the cutting edges 39 and 51 can advantageously stand at about ⅛ inch from the cutting edges of the rotor blades 23.

As to the distance between the lower edge of the flange 52' and the bottom wall 13 of the casing, it is of course to be set to allow a certain amount of slurry to flow through the passage defined thereby so as to avoid the funnel-shaped inlet described above from clugging. The same reasoning applies of course to the location of lower bar 35 of the first embodiment.

Finally, the single bar means 50, 52, 52' may be adjusted in respect to the cutter blades 23 in the same manner as blades 35, 36 and by the adjustment means 40, 41, 42, shown in FIG. 5.

I claim:

1. A forage chopping and propelling device comprising, in combination:
   a. a casing having an inlet at one end, a discharge chute at the other end and a bottom section that is inclined from the discharge chute to the inlet;
   b. means for feeding the forage into the inlet of the casing;
   c. a chopper rotor having a first axis of rotation disposed within the casing for chopping the forage fed into the inlet thereof;
   d. means disposed between the feeding means and chopper rotor for cooperation with the chopper rotor in chopping the forage;
   e. a booster impeller disposed within the casing adjacent the chopper rotor for receiving the chopped forage directly from the chopper rotor and propelling the chopped forage through the discharge chute, said impeller having a second axis of rotation spaced from and parallel to the first axis of rotation to provide rectilinear movement of the forage from the inlet of the casing to the discharge chute; and
   f. at least one recutting bar adjustably mounted to the casing and disposed between the first and second axes of rotation for further cutting the forage chopped by the chopper rotor.

2. The device of claim 1 wherein the recutting bar includes at least one cutting edge thereon.

3. The device of claim 2 wherein the recutting bar is disposed adjacent the periphery of the chopper rotor and includes means for adjustably positioning the bar towards and away from the periphery of the chopper rotor.

4. The device of claim 2 wherein the recutting bar has a substantially rectangular cross-sectional configuration.

5. The device of claim 1 wherein:
   a. the discharge chute is substantially vertical, and b. the first and second axes of rotation are disposed in a plane that is declined towards the discharge chute.

6. The device of claim 5 wherein the bottom section of the casing is substantially parallel to the declined plane.

7. The device of claim 1 wherein the means disposed between the feeding means and chopper rotor includes an apron having a substantially right angle configuration.

8. The device of claim 1, wherein the angle of inclination of the bottom section of the casing is between approximately 5° to 35° from the horizontal.

9. The device of claim 8 wherein the angle of inclination is approximately 17°.

10. The device of claim 1 wherein the recutting bar includes a cutting edge disposed adjacent the periphery of the chopper rotor in forage cutting relationship therewith and a flange depending from the said cutting edge towards said bottom section and terminating short therefrom.

11. The device of claim 10 including means for adjustably positioning the recutting bar towards and away from the periphery of the chopper rotor.

* * * * *